United States Patent
Takahashi

(10) Patent No.: US 11,703,872 B2
(45) Date of Patent: Jul. 18, 2023

(54) MACHINE LEARNING METHOD AND MOBILE ROBOT

(71) Applicant: Toyota Jidosha Kabushiki Kaisha, Toyota (JP)

(72) Inventor: Taro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 565 days.

(21) Appl. No.: 16/868,089

(22) Filed: May 6, 2020

(65) Prior Publication Data

US 2020/0379473 A1    Dec. 3, 2020

(30) Foreign Application Priority Data

May 29, 2019    (JP) ................................ 2019-100532

(51) Int. Cl.
*G05D 1/02* (2020.01)
*B25J 9/00* (2006.01)
(Continued)

(52) U.S. Cl.
CPC .............. *G05D 1/0221* (2013.01); *B25J 5/00* (2013.01); *B25J 9/0003* (2013.01); *B25J 9/0081* (2013.01);
(Continued)

(58) Field of Classification Search
CPC .. G05D 1/0221; G05D 1/0214; G05D 1/0236; G05D 1/0223; G05D 1/024; G05D 1/0251; G05D 1/0276; G05D 2201/0211; B25J 5/00; B25J 9/0003; B25J 9/0081; B25J 13/003; B25J 13/08; B25J 9/162;
(Continued)

(56) References Cited

U.S. PATENT DOCUMENTS

| | | | |
|---|---|---|---|
| 2009/0326713 A1 | 12/2009 | Moriya | |
| 2017/0241790 A1* | 8/2017 | Yoshikawa | .......... G05D 1/0217 |
| 2018/0050634 A1* | 2/2018 | White | .................. G05D 1/0016 |

FOREIGN PATENT DOCUMENTS

| | | |
|---|---|---|
| JP | 2007-316799 A | 12/2007 |
| JP | 2009-291540 A | 12/2009 |

(Continued)

OTHER PUBLICATIONS

English Translation for JP2019008431 (Year: 2019).*
English Translation for JP2018018146 (Year: 2018).*

*Primary Examiner* — Rachid Bendidi
(74) *Attorney, Agent, or Firm* — Dinsmore & Shohl LLP

(57) ABSTRACT

A machine learning method includes: a first learning step which is performed in a phase before a neural network is installed in a mobile robot and in which a stationary first obstacle is placed in a set space and the first obstacle is placed at different positions using simulation so that the neural network repeatedly learns a path from a starting point to the destination which avoids the first obstacle; and a second learning step which is performed in a phase after the neural network is installed in the mobile robot and in which, when the mobile robot recognizes a second obstacle that operates around the mobile robot in a space where the mobile robot moves, the neural network repeatedly learns a path to the destination which avoids the second obstacle every time the mobile robot recognizes the second obstacle.

9 Claims, 10 Drawing Sheets

(51) Int. Cl.
*B25J 5/00* (2006.01)
*B25J 13/08* (2006.01)
*G05B 13/02* (2006.01)
*B25J 13/00* (2006.01)

(52) U.S. Cl.
CPC ............. *B25J 13/003* (2013.01); *B25J 13/08* (2013.01); *G05B 13/027* (2013.01); *G05D 1/0214* (2013.01)

(58) Field of Classification Search
CPC ... B25J 9/1664; B25J 11/0005; G05B 13/027; G05B 19/4061; G05B 2219/39082; G05B 2219/39091; G05B 2219/39271; G05B 2219/39315; G05B 2219/40411
See application file for complete search history.

(56) References Cited

FOREIGN PATENT DOCUMENTS

| | | | |
|---|---|---|---|
| JP | 2017-204145 A | | 11/2017 |
| JP | 2018-018146 A | | 2/2018 |
| JP | 2018018146 A | * | 2/2018 |
| JP | 2019-008431 A | | 1/2019 |
| JP | 2019008431 A | * | 1/2019 |

* cited by examiner

MACHINE LEARNING METHOD AND MOBILE ROBOT

CROSS-REFERENCE TO RELATED APPLICATIONS

This application claims priority to Japanese Patent Application No. 2019-100532 filed on May 29, 2019, which is incorporated herein by reference in its entirety including the specification, drawings and abstract.

BACKGROUND

1. Technical Field

The disclosure relates to machine learning methods and mobile robots.

2. Description of Related Art

Mobile robots that autonomously move to a target point are known in the art. The mobile robots determine a path to a target point using an environment map and moves along the path. For example, Japanese Patent Application Publication No. 2009-291540 discloses a technique that evaluates the possibility of collision with an obstacle on a travel path.

SUMMARY

When a mobile robot autonomously moves to a destination, it often analyzes map information to plan a travel path. However, the map information does not include information on obstacles that operate in an environment such as humans and other mobile robots. The map information merely describes information on stationary obstacles. Accordingly, even when the mobile robot moves along the planned travel path, it needs to analytically plan an avoidance path that avoids an obstacle every time it detects an operating obstacle.

Since the mobile robot analytically plans both a travel path and an avoidance path, it takes time for the mobile robot to perform calculations, which limits the mobility of the mobile robot. A learned neural network can therefore be used to avoid such analytic calculations. However, it is practically difficult to make a neural network machine-learn the positions and states of stationary obstacles and operating obstacles and path planning for each combination thereof.

The disclosure provides a practical machine learning method for a neural network which implements smooth autonomous movement of a mobile robot, and a mobile robot that autonomously moves using a learned neural network having learned by the machine learning method.

A first aspect of the disclosure relates to a machine learning method. The machine learning method is a machine learning method for a neural network that causes a computer to function to output a path for a mobile robot to move to a destination, based on provided map information and detected moving body information. The machine learning method includes: a first learning step which is performed in a phase before the neural network is installed in the mobile robot and in which a stationary first obstacle is placed in a set space and the first obstacle is placed at different positions using simulation such that the neural network repeatedly learns a path from a starting point to the destination which avoids the first obstacle; and a second learning step which is performed in a phase after the neural network is installed in the mobile robot and in which, when the mobile robot recognizes a second obstacle that operates around the mobile robot in a space where the mobile robot moves, the neural network repeatedly learns a path to the destination which avoids the second obstacle every time the mobile robot recognizes the second obstacle.

Since the machine learning is thus performed in two stages, the learned neural network adapted to a working space where the mobile robot in which the neural network is installed moves autonomously can be quickly produced. That is, neural networks that are to be installed on mobile robots to be used in various working spaces learn in common a path to a destination which avoids a stationary obstacle before the neural networks are installed on the mobile robots. The neural networks individually learn avoidance of an operating obstacle which greatly depends on the properties of the working space after the neural networks are installed on the mobile robots. This machine learning method thus improves learning efficiency and adaptability to each mobile robot.

In the machine leaning method of the above aspect, in the second learning step, the neural network may learn a path indicated by a user as at least a part of the path to the destination. Training data can be more easily obtained when the user indicates a path avoids the operating obstacle In the machine learning method of the above aspect, in the second learning step, the path indicated by the user may be obtained based on a voice of the user. For example, when a microphone receives a voice "Avoid to the right," the position of the obstacle and the operating speed of the obstacle are obtained, and such a path that avoids the obstacle to the right is planned. Similarly, in the machine learning method of the above aspect, in the second learning step, the path indicated by the user may be obtained based on an action of the user. For example, when a camera captures a gesture of the user pointing his or her finger to the right, the position of the obstacle and the operating speed of the obstacle are obtained, and such a path that avoids the obstacle to the right is planned. In the machine learning method of the above aspect, in the second learning step, the path indicated by the user may be obtained based on a force that is applied to the mobile robot by the user. For example, when a force that presses the mobile robot to the right by the user is detected, the position of the obstacle and the operating speed of the obstacle are obtained, and such a path that avoids the obstacle to the right is planned. In any case, the user can easily indicate a path that avoids the obstacle to the mobile robot without performing any complicated operation.

In the above aspect, the second learning step may include a case where a virtual second obstacle is generated and the mobile robot is caused to recognize the virtual second obstacle. After a certain number of specific typical examples of a moving obstacle are obtained, similar obstacles are virtually generated at various locations and the neural network is made to learn paths that avoids such virtual obstacles. A large amount of training data can thus be obtained.

In the machine leaning method of the above aspect, a moving plane on which the mobile robot moves in the set space may be represented by m by n cells, n and m are a natural number of 2 or greater, and the first obstacle and the second obstacle may be recognized by the mobile robot as obstacles that occupies the cells. By using such a data structure, the mobile robot can be adapted to various spaces where the mobile robot moves autonomously. Moreover, since the data structure is simple, this contributes to reduction in amount of calculation.

A second aspect of the disclosure relates to a mobile robot. The mobile robot is a mobile robot in which a learned neural network is installed, the learned neural network having learned by the machine learning method of the first aspect. The mobile robot includes: an obtaining unit configured to obtain map information describing the first obstacle and a destination; a detection unit configured to detect the second obstacle that operates around the mobile robot; a calculation unit configured to input the map information and the destination which are obtained by the obtaining unit and detection information on the second obstacle detected by the detection unit to the learned neural network to calculate a path to the destination; and a movement control unit configured to control the mobile robot to move along the path calculated by the calculation unit.

The mobile robot controlled in this manner can quickly determine a path to take, and therefore can smoothly move autonomously. In this case, in the mobile robot of the above aspect, the calculation unit may be configured to update the path every time the detection unit detects the second obstacle. By updating the path in this manner, an optimal path according to the situation can be selected.

The disclosure provides a practical machine learning method for a neural network which implements smooth autonomous movement of a mobile robot and a mobile robot that autonomously moves using a learned neural network having learned by the machine learning method.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The disclosure will be described based on an embodiment of the disclosure. However, the disclosure according to the claims is not limited to the following embodiment.

Figure 1:
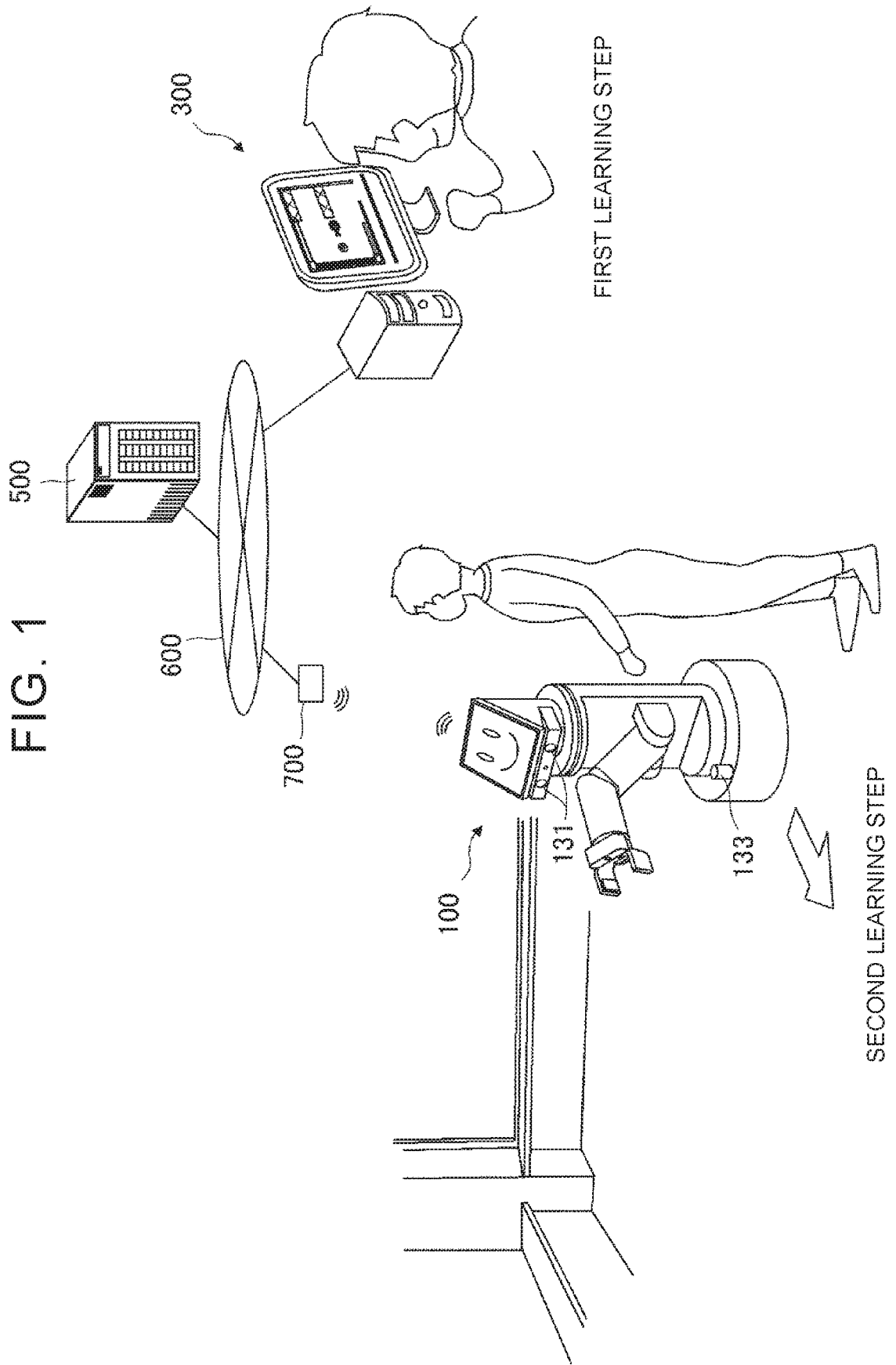
FIG. 1 is a conceptual diagram illustrating an entire system that performs a machine learning method according to an embodiment.

FIG. 1 is a conceptual diagram illustrating the entire system that performs a machine learning method according to the present embodiment. The system generally functions as a machine learning device that performs machine learning of a neural network. In the present embodiment, the neural network for machine learning is a path planning neural network (hereinafter referred to as the path planning NN) that causes a computer to function to output a path to a destination which should be followed by a mobile robot when provided map information, detected moving body information, etc. are input to the computer.

The system includes a simulation PC 300 and a mobile robot 100. The simulation PC 300 performs up to a first learning step of the path planning NN, and the mobile robot 100 performs a second learning step following the first learning step. The mobile robot 100 is connected to the Internet 600 via a wireless unit 700. The simulation PC 300 and a system server 500 are also connected to the Internet 600.

It is herein assumed that an environment in which the first learning step is performed and an environment in which the second learning step is performed are located away from each other and can be connected to each other via the Internet 600. Specifically, the path planning NN having completed machine learning of up to the first learning step using the simulation PC 300 is installed in the mobile robot 100 via the system server 500. The path planning NN may be transferred from the simulation PC 300 to the mobile robot 100 using a detachable memory without using the Internet 600. Close proximity wireless communication may be used in the case where the environment in which the first learning step is performed and the environment in which the second learning step is performed are located close to each other.

It is desirable that the environment in which the second learning step is performed be an environment in which the mobile robot 100 is actually operated or an environment similar to that environment. For example, in the case where a plurality of mobile robots 100 are going to be used in different environments, the simulation PC 300 first performs the first learning step of the path planning NN. The path planning NN is then installed in each mobile robot 100, and the second learning step of the path planning NN is performed in the environment in which each mobile robot 100 is operated.

Figure 2:
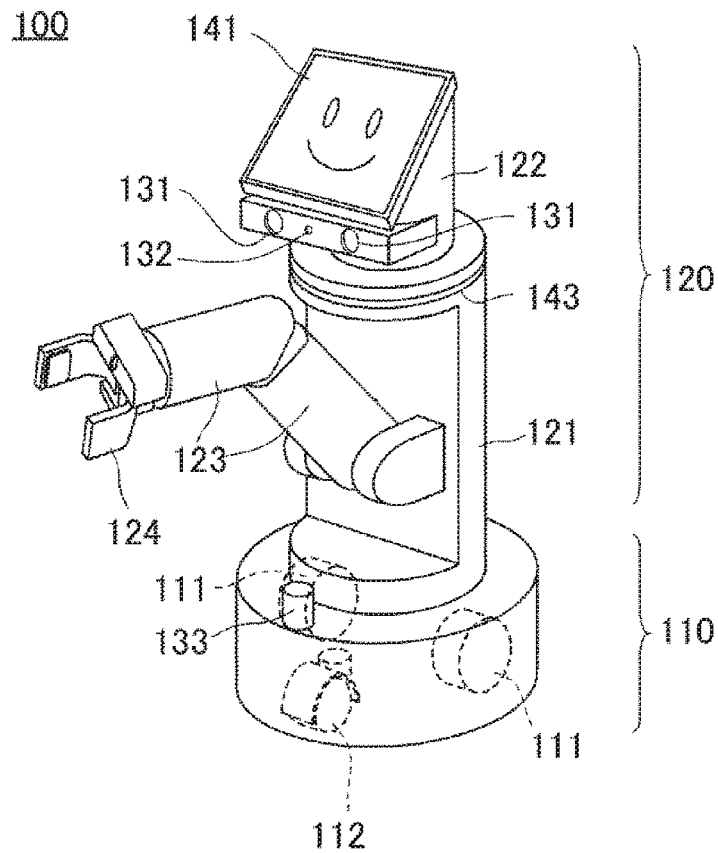
FIG. 2 is a perspective view illustrating the appearance of a mobile robot.

FIG. 2 is a perspective view illustrating the appearance of the mobile robot 100 that is an example of a mobile robot in which the path planning NN is installed. The mobile robot 100 is roughly composed of a platform 110 and a body 120. The platform 110 supports two drive wheels 111 and one caster 112 in a cylindrical housing. The two drive wheels 111 and the caster 112 contact a surface on which the mobile robot 100 moves. The two drive wheels 111 are disposed so as to have the same rotation axis. Each drive wheel 111 is independently driven to rotate by a motor, not shown. The caster 112 is a driven wheel and is provided so that a turning shaft extending in the vertical direction from the platform 110 supports the wheel at a position away from the rotation axis of the wheel. The caster 112 follows the direction in which the platform 110 moves.

The platform 110 has a laser scanner 133 on the periphery of its upper surface. The laser scanner 133 scans a certain range in a horizontal plane at every step angle and outputs whether or not there is an obstacle in each direction. When there is an obstacle, the laser scanner 133 outputs the distance to the obstacle. The mobile robot 100 knows whether the obstacle is operating or not, and when the obstacle is operating, knows the direction and speed of the operation of the obstacle, by analyzing the continuous output of the laser scanner 133.

The body 120 mainly includes a trunk 121, a head 122, an arm 123, and a hand 124. The trunk 121 is placed on the upper surface of the platform 110. The head 122 is placed on the upper surface of the trunk 121. The arm 123 is supported on a side surface of the trunk 121. The hand 124 is attached to the tip end of the arm 123. The arm 123 and the hand 124 are driven by a motor, not shown to hold various objects in a controlled attitude. The trunk 121 can rotate about a vertical axis with respect to the platform 110 by the driving force of a motor, not shown. The trunk 121 has in its upper part a pressing unit 143 extending in the circumferential direction. The pressing unit 143 is an annular pressing switch group consisting of a plurality of pressing switches aligned in the circumferential direction. The pressing unit 143 detects from which direction in the radial direction the trunk 121 has been pressed.

The head 122 mainly includes a stereo camera 131, a microphone 132, and a display panel 141. The stereo camera 131 is composed of two camera units with the same angle of view being disposed away from each other. The stereo camera 131 outputs imaging signals captured by the camera units. The microphone 132 converts a sound produced in the surrounding environment or a user's voice into an audio signal. The display panel 141 is, e.g., a liquid crystal panel. The display panel 141 displays a set character's face by animation and displays information on the mobile robot 100 by text or icons.

The head 122 can rotate about the vertical axis with respect to the trunk 121 by the driving force of a motor, not shown. The stereo camera 131 can therefore capture an image of an object located in any direction, and the display panel 141 can show displayed data in any direction. The mobile robot 100 can also know the distance and direction to any surrounding obstacle, and when the obstacle operates, knows the direction and speed of the operation of the obstacle, by analyzing the imaging signals captured by the stereo camera 131.

Figure 3:
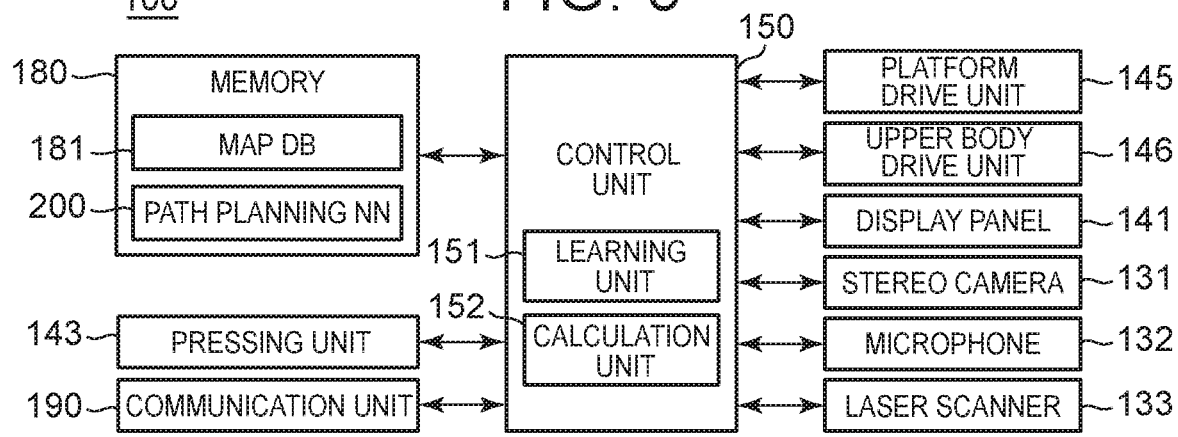
FIG. 3 is a control block diagram of the mobile robot.

FIG. 3 is a control block diagram of the mobile robot 100. A control unit 150 is, e.g., a central processing unit (CPU) and is stored in, e.g., a control unit provided in the trunk 121. A platform drive unit 145 includes the drive wheels 111 and a drive circuit and a motor which drive the drive wheels 111. The control unit 150 performs rotation control of the drive wheels 111 by sending a drive signal to the platform drive unit 145. The control unit 150 receives a feedback signal of an encoder etc. from the platform drive unit 145 and thus knows the direction and speed of movement of the platform 110.

An upper body drive unit 146 includes a grip portion, the trunk 121, the head 122, and a drive circuit and a motor which drive the grip portion, the trunk 121, and the head 122. The grip portion includes the arm 123 and the hand 124. The control unit 150 implements a gripping operation and a change in attitude by sending a drive signal to the upper body drive unit 146. The control unit 150 also receives a feedback signal from an encoder etc. from the upper body drive unit 146 and thus knows the positions and moving speeds of the arm 123 and the hand 124 and the directions and rotational speeds of the trunk 121 and the head 122.

The display panel 141 receives and displays an image signal generated by the control unit 150. The control unit 150 generates an image signal of a character etc. and displays the image signal on the display panel 141 as described above. In the case where the display panel 141 includes a touch panel, the display panel 141 sends a touch signal to the control unit 150.

The stereo camera 131 captures an image of the surrounding environment in response to a request from the control unit 150 and sends imaging signals to the control unit 150. The control unit 150 performs image processing using the imaging signals. The microphone 132 converts a sound produced in the surrounding environment or a user's voice into an audio signal and sends the audio signal to the control unit 150. The laser scanner 133 detects whether there is an obstacle in the moving direction or not in response to a request from the control unit 150 and sends a detection signal, which is the detection result, to the control unit 150. The stereo camera 131 and the laser scanner 133 also function as a detection unit that detects an obstacle operating around the mobile robot 100.

A memory 180 is a nonvolatile storage medium and is, e.g., a solid-state drive. The memory 180 stores various parameter values, functions, lookup tables, etc. to be used for control and calculations, in addition to a control program for controlling the mobile robot 100 and a machine learning program for performing the second learning step. Especially, the memory 180 includes a map database (DB) 181 and a storage area for a learning or learned path planning NN 200. The map DB 181 is a database of map information describing a space where the mobile robot 100 is going to move autonomously.

The map DB 181 stores, e.g., map information sent from the system server 500. The control unit 150 reads map information of a place where the mobile robot 100 is present from the map DB 181 and refers to the map information. The path planning NN 200 is a neural network sent from the system server 500 as described above when starting machine learning of the second learning step. Alternatively, in the operational phase of the mobile robot 100, the path planning NN 200 may be a copy of a learned path planning NN having completed machine learning of the second learning step in the same environment by other mobile robot 100. In the case where the control unit 150 performs machine learning of the second learning step in the learning phase or determines a path to a destination in the operational phase, the control unit 150 reads the path planning NN 200 from the memory 180 and performs calculations described later.

The pressing unit 143 outputs a pressing signal indicating which pressing switch has been pressed out of the plurality of pressing switches disposed in an annular pattern. The control unit 150 receives the pressing signal and recognizes based on the received pressing signal from which direction in the radial direction the pressing unit 143 has been pressed. A communication unit 190 is, e.g., a wireless local area network (LAN) unit and wirelessly communicates with the wireless unit 700. The communication unit 190 sends the map information and the path planning NN 200 received from the system server 500 to the control unit 150.

The control unit 150 performs the overall control and processing for the mobile robot 100 by executing the control program and the machine learning program read from the memory 180. The control unit 150 also serves as a function calculation unit that performs various calculations related to the control and processing. A learning unit 151 and a calculation unit 152 are an example of the function calculation unit. The learning unit 151 reads the learning path planning NN 200 from the memory 180 and performs machine learning of the second learning step. The calculation unit 152 reads the learned path planning NN 200 from the memory 180 and calculates a path to a destination.

Figure 4:
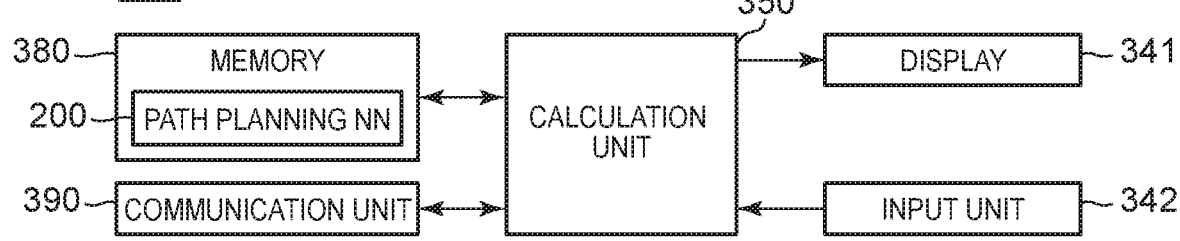
FIG. 4 is a control block diagram of a simulation personal computer (PC)

FIG. 4 is a control block diagram of the simulation PC 300. A calculation unit 350 is, e.g., a CPU and controls the entire simulation PC 300. A display 341 is, e.g., a liquid crystal panel and displays an image signal generated by the calculation unit 350. An input unit 342 is, e.g., a touch panel installed on the display 341 or a keyboard and a mouse. The input unit 342 converts a user's operation input into an electrical signal and sends the electrical signal to the calculation unit 350.

A memory 380 is a nonvolatile storage medium and is, e.g., a solid-state drive. The memory 380 stores various parameter values, functions, lookup tables, etc. to be used for control and calculations, in addition to a control program for controlling the mobile robot 100 and a machine learning program for performing the first learning step. Especially, the memory 380 includes a storage area for a learning or unlearned path planning NN 200. The calculation unit 350 reads the learning or unlearned path planning NN 200 from the memory 380 and performs machine learning of the first learning step.

A communication unit 390 is, e.g., a wired LAN unit and implements connection to the Internet 600. The communication unit 390 sends the path planning NN 200 having completed machine learning of the first learning step to the system server 500.

Figure 5:
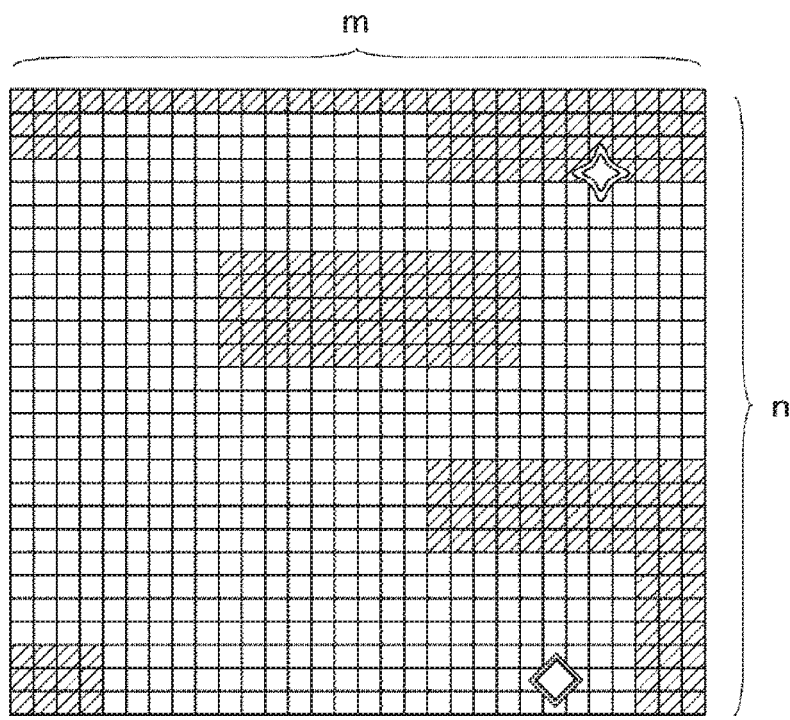
FIG. 5 is a conceptual diagram illustrating a data structure describing a target space.

Next, the map information will be described. The map information includes a data structure that describes the state of a target space. FIG. 5 is a conceptual diagram illustrating the data structure describing a target space.

The target space where the mobile robot 100 moves is divided into a plurality of cells and expressed two-dimensionally as a moving plane on which the mobile robot 100 moves. In the example shown in the figure, the moving plane is divided into m by n square cells (m is a natural number of 2 or greater and represents the number of cells in the lateral direction in the figure, and n is a natural number of 2 or greater and represents the number of cells in the vertical direction in the figure). Addresses each indicating the position of a corresponding cell in the entire moving plane are individually assigned to the cells.

In the example shown in the figure, the hatched cells indicate that there is a stationary obstacle (hereinafter sometimes referred to as a first obstacle) in the target space. That is, the mobile robot 100 cannot pass through the hatched cells. It is also not allowed for a part of the mobile robot 100 to interfere with the hatched cells while the mobile robot 100 is moving. For example, a table placed near the center of a room, a shelf placed by a wall, pillars in the four corners of a room, etc. are regarded as first obstacles, and the cells corresponding to the first obstacles are shown hatched according to their positions and sizes.

The starting point (diamond symbol) and the destination (star symbol) of the mobile robot are provided on the moving plane that expresses the target space by such a data structure. The size of the diamond symbol representing the starting point is determined in view of the occupied area of the mobile robot (in the present embodiment, the mobile robot 100) on the moving plane. That is, all the paths that can sweep the diamond symbol located at the starting point to the position of the star symbol such that the outer shape of the diamond symbol does not contact the hatched cells are candidate travel paths. The user determines and inputs an optimal one of the candidate travel paths.

Every time the user repeats this operation, training data for the first learning step of the path planning NN 200 is generated. That is, input values of the training data for the first learning step are the arrangement of the first obstacles on the moving plane divided into the m by n cells, a set starting point, and a set destination, and a correct answer that is an output value of the training data for the first learning step is a travel path determined by the user.

Figure 6:
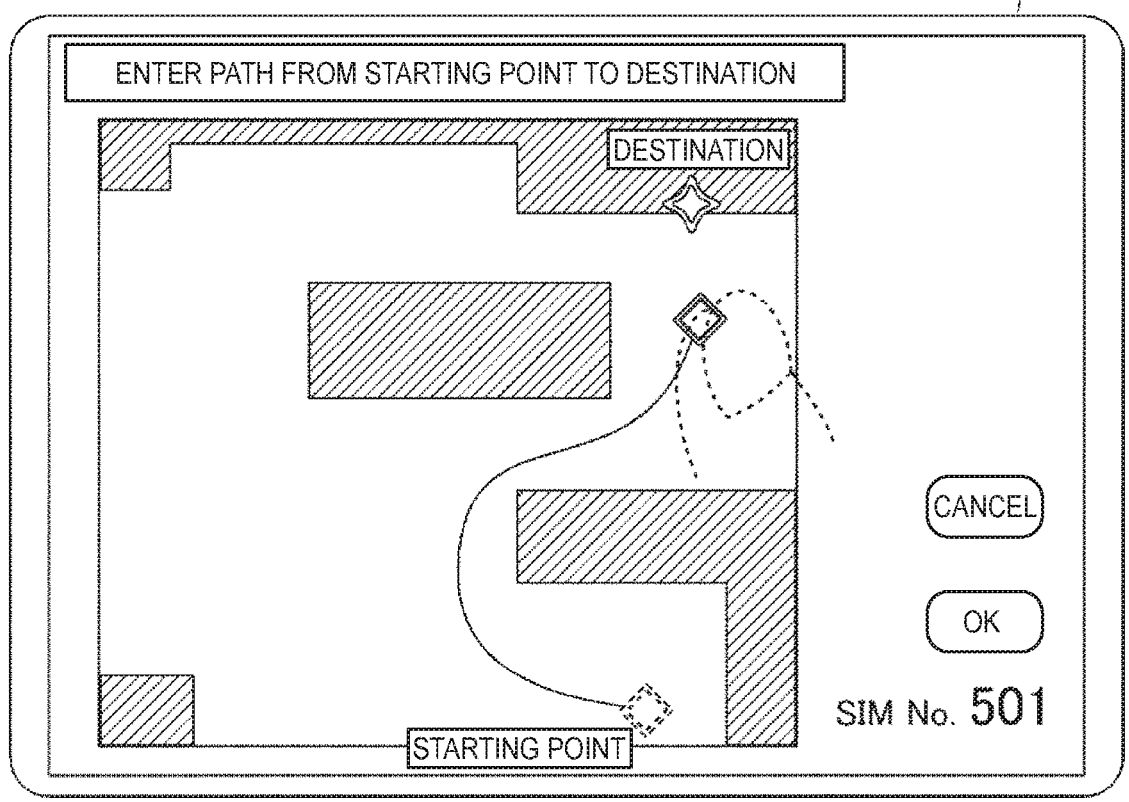
FIG. 6 illustrates generation of training data in a first learning step.

FIG. 6 specifically illustrates generation of the training data in the first learning step. FIG. 6 illustrates an image displayed on the display 341 of the simulation PC 300.

The calculation unit 350 randomly places the first obstacles on the moving plane divided into the m by n cells. The size and number of first obstacles to be placed may be limited in advance in view of obstacles that can actually exist. For example, in the case where the target space is an office, obstacles such as desks and cabinets can be considered as first obstacles. In the case where the target space is a factory, obstacles such as machine tools and transport devices can be considered as first obstacles. The calculation unit 350 displays the first obstacles hatched within the frame of the moving plane.

The calculation unit 350 also randomly determines the positions of a starting point and a destination and displays a diamond symbol (starting point) and a star symbol (destination). The starting point is selected and determined from the cells where the first obstacles are not located, and the destination is selected and determined from the cells where the first obstacles are not located and the cells in the periphery of each first obstacle. As described above, the size of the diamond symbol is determined according to the area of the mobile robot in which the path planning NN 200 is installed. Basic conditions such as the size of the moving plane, the limitation on the first obstacles, and the size of the mobile robot are specified in advance by the user.

A touch panel is installed as the input unit 342 on the display 341. When the user receives a prompt like "Enter path from starting point to destination" as shown in the figure, he or she drags the diamond symbol to the star symbol on the display 341. The path generated by this drag operation is displayed as a line. When the user touches an OK button, the calculation unit 350 records this path as a correct answer for the travel path determined by the user. In the case were the diamond symbol contacts any of the first obstacles while being dragged, the calculation unit 350 requests the user to retry.

The calculation unit 350 records the generated set of the arrangement of the first obstacles, the starting point, the destination, and the travel path as a correct answer in the memory 380 as a single piece of training data. The calculation unit 350 repeatedly causes the user to perform this operation until a predetermined number of pieces of training data are collected or until the user inputs a command to terminate the operation.

Figure 7:
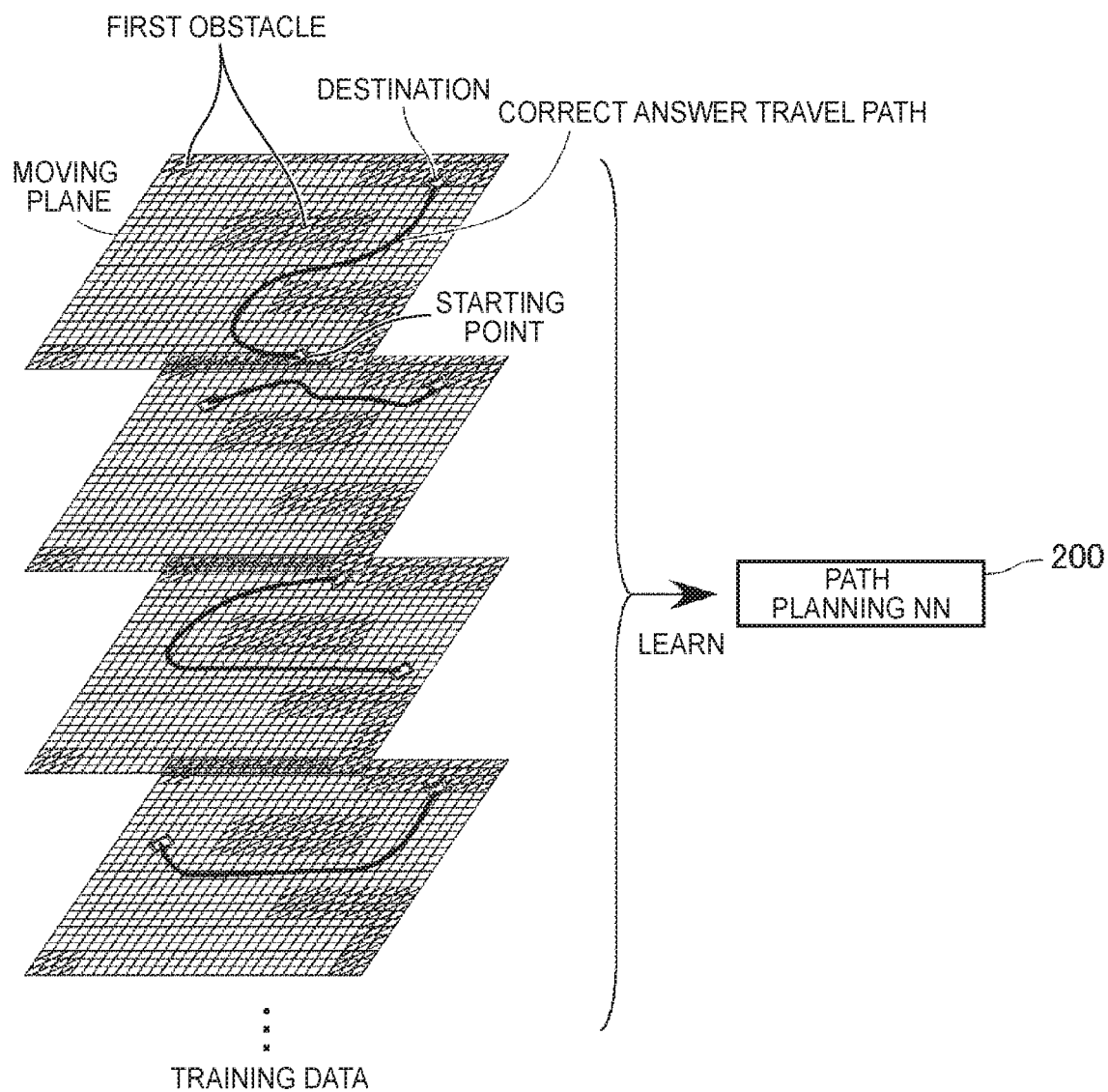
FIG. 7 is a conceptual diagram illustrating the concept of learning in the first learning step.

FIG. 7 illustrates the concept of learning in which the path planning NN 200 learns using the training data in the first learning step. When the training data is prepared by repeating the operation shown in FIG. 6, learning of the path planning NN 200 is performed by supervised leaning. The input values to the path planning NN 200 are the arrangement of the first obstacles on the moving plane divided into the m by n cells, the set starting point, and the set destination as described above, and it is assumed that there is no obstacle that operates. The calculation unit 350 evaluates the error between a travel path that is output from the learning path planning NN 200 and a travel path as a correct answer and updates the weight of each edge using an error back-propagation method so as to reduce the error. The calculation unit 350 evaluates the error using, e.g., the sum of the distances between reference points provided at regular intervals between the starting point and the destination. The smaller the sum is, the closer the travel path is evaluated to be to the correct answer.

In the above example, the calculation unit 350 performs the learning of the path planning NN 200 after a certain number of pieces of training data are collected. However, the calculation unit 350 may perform the learning of the path planning NN 200 every time the training data is generated. The path planning NN 200 having completed the first learning step is installed in the mobile robot 100 via the Internet 600 as described above.

Figure 8:
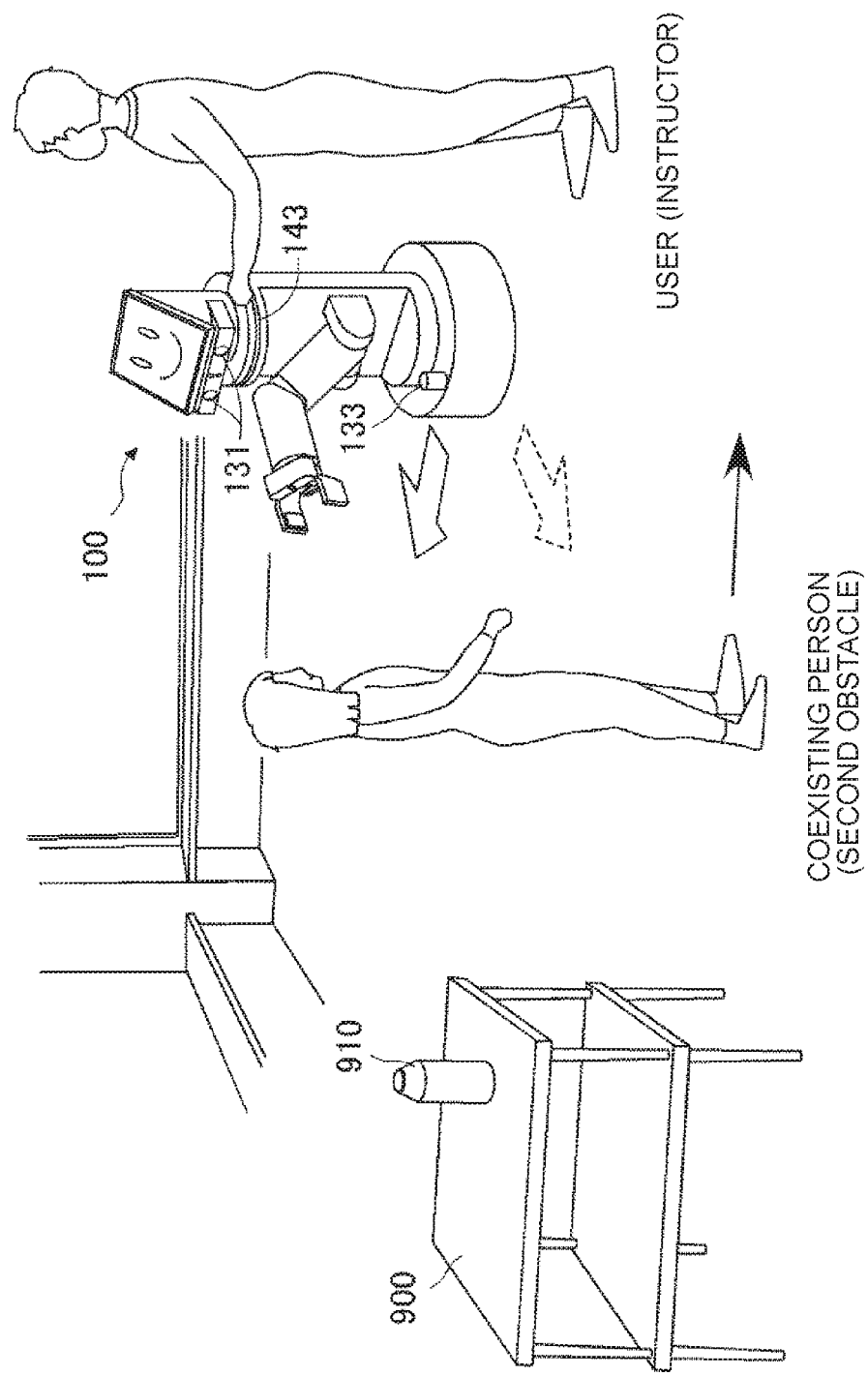
FIG. 8 is a conceptual diagram illustrating learning in a second learning step.

FIG. 8 is a conceptual diagram illustrating learning in the second learning step. As described above, it is desirable that the environment in which the second learning step is performed be an environment in which the mobile robot 100 is actually operated or an environment similar to this environment. That is, the second learning step is a step of learning how to handle an obstacle that can actually be encountered (hereinafter sometimes referred to as a second obstacle) in an actual environment or an environment similar to the actual environment according to the future operation of the mobile robot 100. The user who performs the second learning step may be different from the user who performed the first learning step.

The mobile robot 100 has obtained map information on the space in which the second learning step is to be performed. That is, the mobile robot 100 has in the map DB 181 the map information that describes first obstacles actually placed in the space such as a table and pillars on a moving plane divided into m by n cells. For example, a table 900 illustrated in the figure is described as a first obstacle in the map information.

The learning unit 151 sets the current location as a starting point and sets as a destination a cell randomly selected from the cells where the first obstacles are not located and the cells in the periphery of each first obstacle. The learning unit 151 then plans a travel path to the destination using the path planning NN 200. After the travel path is planned, a drive signal is sent to the platform drive unit 145 to move the mobile robot 100 along the travel path.

For example, in the case where the destination is a cell corresponding to a position near a container 910 in the figure and there is no second obstacle that is not described in the map information but is actually present in the environment, the mobile robot 100 moves in the direction shown by a white dashed arrow along the travel path determined by the path planning NN 200. However, when the stereo camera 131 or the laser scanner 133 detects a coexisting person operating in the moving direction, the learning unit 151 notifies the user, who is an instructor, of the presence of the coexisting person and asks for an instruction on which direction to go. The coexisting person is a person who can coexist in the environment where the mobile robot 100 moves and is one of the second obstacles for the mobile robot 100.

After recognizing the situation, the user shows the direction to be avoided to the mobile robot 100 so that the mobile robot 100 does not contact the second obstacle. In this example, the user shows the direction to be avoided to the mobile robot 100 by pressing the pressing unit 143 in the direction to be avoided. The learning unit 151 obtains the direction in which the pressing unit 143 has been pressed and thus recognizes the direction to be avoided as shown by, e.g., a continuous white arrow. The learning unit 151 calculates a travel path to the destination which avoids the second obstacle, based on the recognized direction to be avoided.

It can be said that the user directly or indirectly indicates at least a part of the travel path to the destination by pressing the pressing unit 143 in the direction to be avoided as described above. The way in which the user indicates at least a part of the travel path is not limited to pressing the pressing unit 143, and various methods can be used. For example, the learning unit 151 can analyze a user's action from the output image of the stereo camera 131 and recognize the direction to be avoided. As an example, the learning unit 151 recognizes the direction in which the user points his or her finger or the direction the user indicates by gesture as the direction to be avoided. Alternatively, the learning unit 151 may analyze a user's voice from the audio signal received from the microphone 132 and recognize the direction to be avoided based on the analysis result. As an example, the learning unit 151 recognizes the direction to be avoided from a voice such as "Turn right by 45 degrees."

In the case where the mobile robot 100 has a grip capable of detecting the pressing force and the pressing direction, the learning unit 151 may recognize the direction to be avoided by determining the force applied to the mobile robot 100 by the user holding the grip and the direction in which the force is applied. In the case where the mobile robot 100 has such a grip and the learning unit 151 continuously detects the direction of pressing by the user or continuously analyzes a voice or gesture, the learning unit 151 may recognize not only the direction to be avoided but also an avoidance path indicated by the user.

The second obstacles are not limited to people who can coexist in the environment but may be other mobile robots, indoor mobilities, robot arms, and depending on the environment, animals, etc. That is, the mobile robot 100 can perform the second learning step in accordance with the second obstacles to be recognized in the environments where the mobile robot 100 will be operated in the future.

Figure 9A:
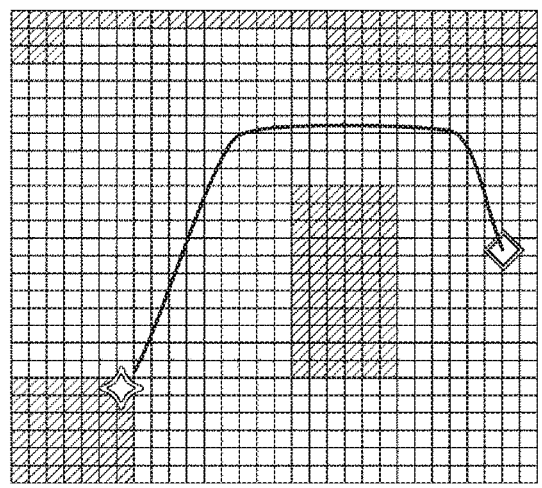
FIG. 9A illustrates generation of training data in the second learning step.
Figure 9B:
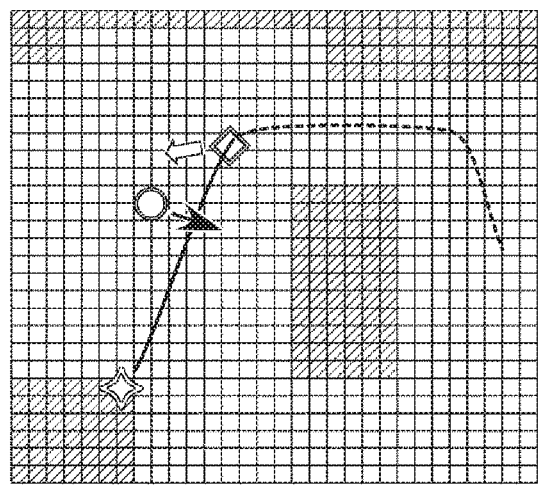
FIG. 9B illustrates generation of training data in the second learning step.
Figure 9C:
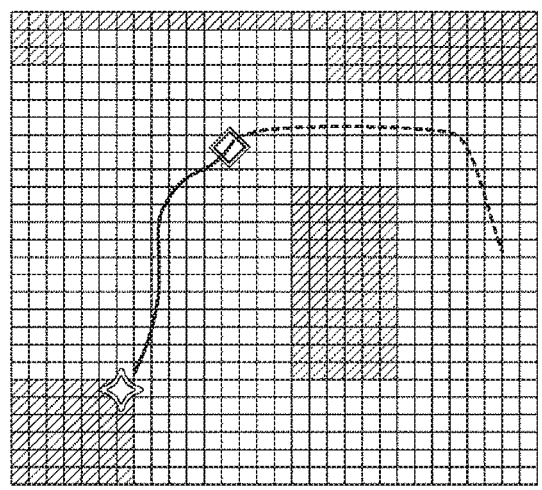
FIG. 9C illustrates generation of training data in the second learning step.

FIGS. 9A to 9C illustrate generation of training data in the second learning step. In FIG. 9A, a travel path from a starting point to a destination generated by the path planning NN 200 having completed the first learning step is shown by a thick line. As described above, the starting point is indicated by a diamond symbol and the destination is indicated by a star symbol. No second obstacle has not been considered at this point.

FIG. 9B illustrates the state when the mobile robot 100 recognizes a second obstacle indicated by a double circle. The path shown by a dashed line is a path along which the mobile robot 100 has already moved. The double circle is drawn over the cells corresponding to the position where the second obstacle is present. The black arrow indicates a motion vector of the second obstacle and represents the direction and speed of operation of the second obstacle at the time the mobile robot 100 recognizes the motion vector. That is, when the learning unit 151 detects a second obstacle, it recognizes the position of the second obstacle relative to the mobile robot 100 and the direction and speed of the operation of the second obstacle.

The white arrow indicates the direction to be avoided which is indicated by the user. The learning unit 151 generates an avoidance path that matches the direction to be avoided using an existing algorithm. The avoidance path is a path that extends from the point where the mobile robot 100 found the second obstacle, avoids the second obstacle, and smoothly and quickly returns to the travel path of FIG. 9A. FIG. 9C is a travel path connecting the avoidance path thus generated and the original travel path after returning from the avoidance path.

The learning unit 151 records the travel path from the recognition point where the mobile robot 100 recognized the second obstacle to the destination, which is shown by a thick line in FIG. 9C, in the memory 180 as a correct answer for the case where the input values are the original travel path shown by a thick line in FIG. 9B, the relative position of the second obstacle, and the direction and speed of the operation of the second obstacle. That is, the learning unit 151 records a set of correct answers to such input values as a single piece of training data. The original travel path shown by the thick line in FIG. 9B is a travel path from the point where the mobile robot 100 found the second obstacle to the destination. The learning unit 151 causes the user to repeatedly perform this operation until a predetermined number of pieces of training data are collected or the user inputs a command to terminate the operation.

Figure 10:
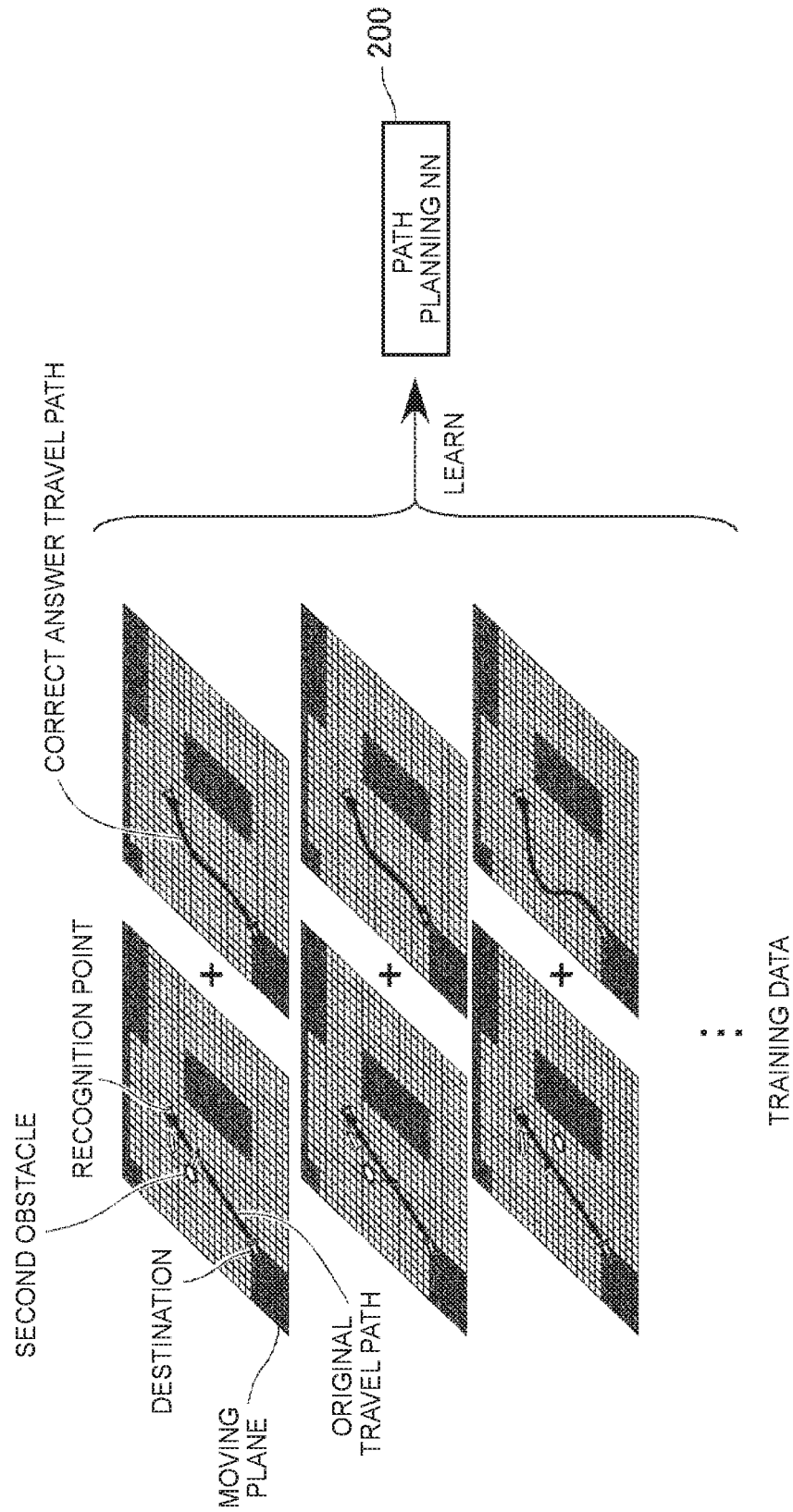
FIG. 10 is a conceptual diagram illustrating the concept of learning in the second learning step.

FIG. 10 is a conceptual diagram illustrating the concept of learning of the path planning NN 200 using training data in the second learning step. When the training data is prepared by repeating the operations shown in FIGS. 9A to 9C, learning of the path planning NN 200 is performed by supervised learning.

As described above, the correct answer label is a travel path connecting the avoidance path for avoiding the second obstacle and the original travel path after returning from the avoidance path. However, depending on the situation of the second obstacle, the correct answer label may be a travel path that reaches the destination without returning to the original travel path. The learning unit 151 evaluates the error between the travel path that is output from the learning path planning NN 200 and the travel path as a correct answer and updates the weight of each edge using the error backpropagation method so as to reduce the error. The learning unit 151 evaluates the error using, e.g., the sum of the distances between reference points provided at regular intervals between the recognition point and the destination. The smaller the sum is, the closer the travel path is evaluated to be to the correct answer.

In the above example, the learning unit 151 performs the learning of the path planning NN 200 is performed after a certain number of pieces of training data are collected. However, the learning unit 151 may perform the learning of the path planning NN 200 every time the training data is generated. The path planning NN 200 having completed the second learning step is used for operation in the mobile robot 100 that has actually performed the second learning step. Alternatively, the path planning NN 200 having completed the second learning step may be transferred to a mobile robot that autonomously moves in a similar environment and may be used for operation in this mobile robot.

Figure 11:
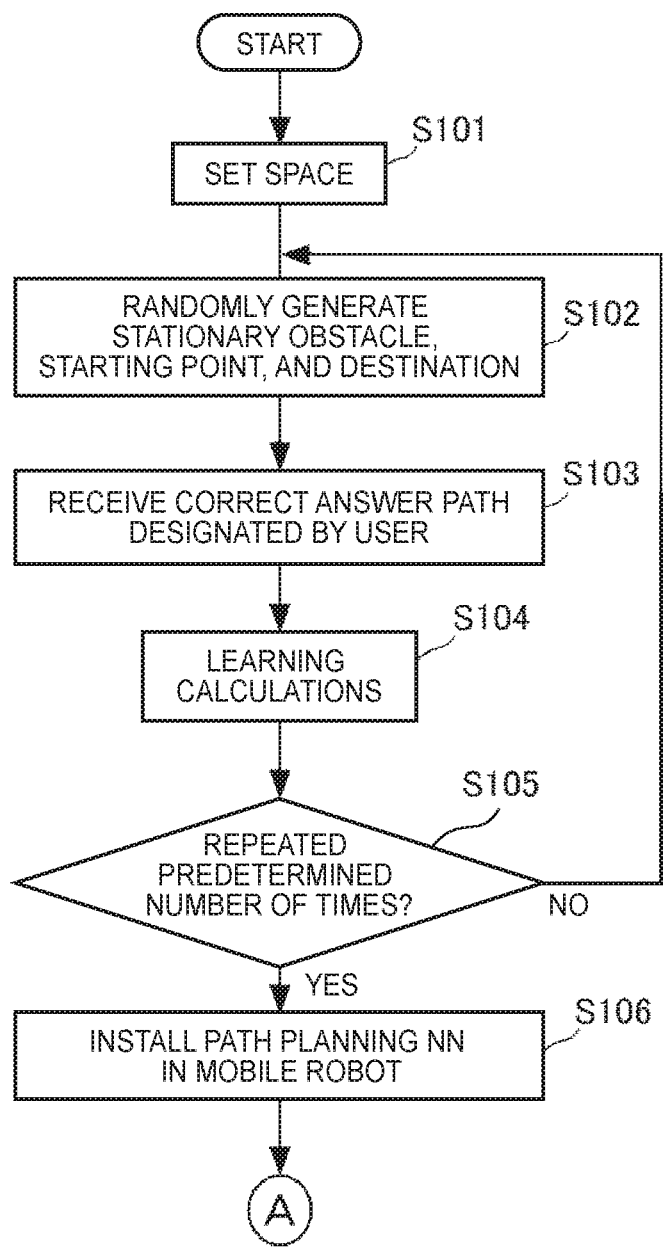
FIG. 11 is a flowchart mainly illustrating the processing in the first learning step of the machine learning method according to the embodiment.

Next, the processing in the machine learning method according to the present embodiment will be described using a flowchart. FIG. 11 is a flowchart mainly illustrating the processing in the first learning step of the machine learning method according to the present embodiment. As described above, the first learning step is performed by the simulation PC 300. In this example, a method in which learning of the path planning NN 200 is performed every time the training data is generated will be described.

In step S101, the calculation unit 350 of the simulation PC 300 considers a moving space for the mobile robot in which the path planning NN 200 that is going to learn from now is going to be installed after the learning is completed, and performs setting regarding the moving space. Specifically, the calculation unit 350 sets the cell size and the number of cells into which the moving space is divided, as designated by the user, in order to define the size of a moving plane. The calculation unit 350 then generates an unlearned path planning NN 200. At this point, the calculation unit 350 may receive basic conditions such as limitations on the size and number of first obstacles and the size of the mobile robot. In the case where the calculation unit 350 receive the basic conditions, the basic conditions are used as processing conditions in later processing.

In step S102, the calculation unit 350 randomly generates a stationary obstacle, a starting point, and a destination for the set moving plane. The calculation unit 350 then converts the stationary obstacle, the starting point, and the destination to such a video signal as shown in FIG. 6 and displays the video signal on the display 341. In step S103, the calculation unit 350 receives a travel path as a correct answer designated by the user. For example, the calculation unit 350 obtains as a correct answer travel path a path produced by the user dragging a diamond symbol displayed at the starting point to a star symbol displayed at the destination by operating the input unit 342. At this time, the calculation unit 350 may correct the path to a smooth curve by, e.g., processing such as spline interpolation. In the case where the path is a path along which the mobile robot cannot move in view of the conditions of the mobile robot received as the basic conditions, the calculation unit 350 may prompt the user to retry.

In step S104, the calculation unit 350 provides the training data generated in step S102 and step S104 to the learning path planning NN 200 and performs the above learning calculations. In step S105, the calculation unit 350 checks whether the learning calculations using the training data have been repeated a predetermined number of times or not. That is, the calculation unit 350 checks whether learning of a predetermined number of pieces of training data has been completed or not. When the learning of the predetermined number of pieces of training data has not been completed, the routine returns to step S102, and the calculation unit 350 repeats the series of processes. When the learning of the predetermined number of pieces of training data has been completed, the routine proceeds to step S106.

In step S106, the calculation unit 350 transfers the path planning NN 200 having completed the first learning step to the mobile robot 100 via the communication unit 190. The path planning NN 200 having completed the first learning step has the ability to output a travel path that avoids the first obstacles when the arrangement of the first obstacles placed on the moving plane, the set starting point, and the set destination are input to the path planning NN 200. The control unit 150 of the mobile robot 100 loads the path planning NN 200 into the memory 180 to install the path planning NN 200 in the mobile robot 100 so that the control unit 150 can use a machine learning program for performing the second learning step.

Figure 12:
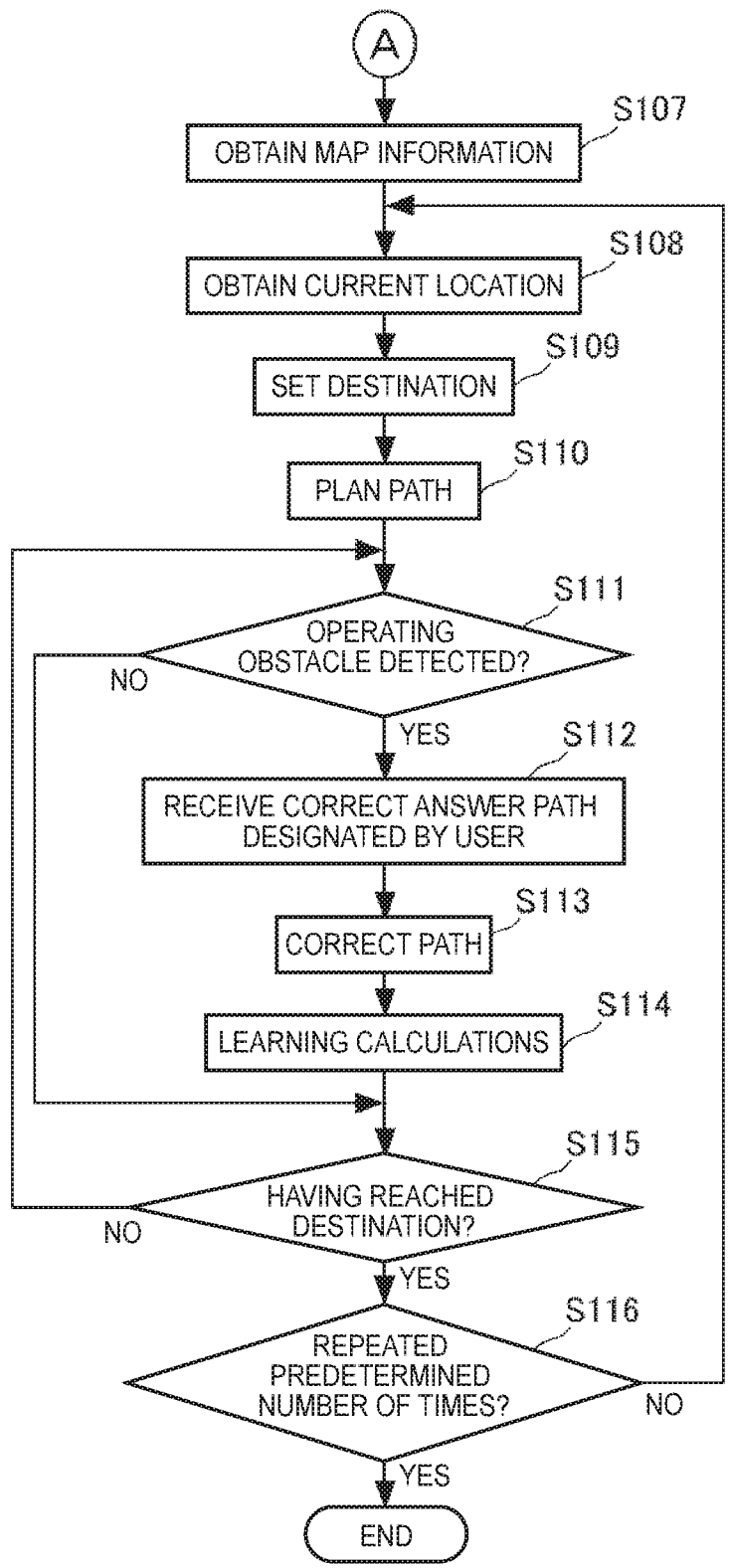
FIG. 12 is a flowchart mainly illustrating the processing in the second learning step of the machine learning method according to the embodiment.

When the installation of the path planning NN 200 having completed the first learning step is completed, the mobile robot 100 performs the second learning step of the path planning NN 200. FIG. 12 is a flowchart mainly illustrating the processing in the second learning step of the machine learning method according to the present embodiment. In this example, a method in which learning of the path planning NN 200 is performed every time the training data is generated will be described.

In step S107, the learning unit 151 obtains map information on a space in which the mobile robot 100 is going to perform the second learning step. The map information thus obtained corresponds to the space set in step S101. That is, the moving plane in the space where the second learning step is performed has the same size as the moving plane where the learning of the first learning step is performed, and the obtained map information has the data structure described with reference to FIG. 5. In the case where the learning unit 151 obtains map information using another expression form, the control unit 150 performs data conversion to convert the obtained map information to map information having this data structure. In the case where a plurality of path planning NNs 200 for target moving planes with different sizes are present in the memory 180, the control unit 150 selects the path planning NN 200 corresponding to the moving plane of the space where the second learning step is going to be performed.

In step S108, the learning unit 151 obtains the current location of the mobile robot 100. That is, the learning unit 151 identifies where the mobile robot 100 is located in the map information obtained in step S107. For example, the learning unit 151 identifies the current location of the mobile robot 100 by comparing the surrounding environment obtained by analyzing the image received from the stereo camera 131 with the map information.

Subsequently, in step S109, the learning unit 151 randomly selects a cell from the cells where the first obstacles are not located and the cells in the periphery of each first obstacle and sets the selected cell as a destination based on the obtained map information. In step S110, the learning unit 151 plans a travel path to the destination using the path planning NN 200. The input values to the path planning NN 200 at this point are the arrangement of the first obstacles shown in the obtained map information, the starting point (current location), and the destination, and information on second obstacles are not provided to the path planning NN 200. After the travel path is planned, a drive signal is sent to the platform drive unit 145 to move the mobile robot 100 along the travel path.

The learning unit 151 monitors whether any second obstacle, which is an obstacle that operates, is present around the mobile robot 100 or not while the mobile robot 100 is moving. Specifically, the learning unit 151 periodically analyzes an image of the stereo camera 131 and an output signal of the laser scanner 133 to detect a second obstacle that is present around the mobile robot 100. When it is determined in step S111 that no second obstacle has been detected, the routine proceeds to step S115. When it is determined in step S111 that a second obstacle has been detected, the routine proceeds to step S112.

In step S112, the learning unit 151 receives from the user an avoidance path or a direction to be avoided as a correct answer to the detected obstacle, as described with respect to FIG. 8. In step S113, the learning unit 151 corrects the travel path to the destination as described with reference to FIGS. 9A to 9C. The learning unit 151 adjusts the training data using the corrected travel path as a correct answer for the case where the original travel path, the relative position of the second obstacle, and the direction and speed of operation of the second obstacle are input to the path planning NN 220. After the learning unit 151 adjusts the training data, the routine proceeds to step S114. In step S114, the learning unit 151 performs learning of the path planning NN 200 by supervised learning. After the learning using the training data is completed, the routine proceeds to step S115.

In step S115, the learning unit 151 determines whether the mobile robot 100 has reached the destination set in step S109 or not. When it is determined in step S109 that the mobile robot 100 has not reached the destination, the routine returns to step S111, and the mobile robot 100 continues to move to the destination. When it is determined in step S109 that the mobile robot 100 has reached the destination, the routine proceeds to step S116. In step S116, the learning unit 151 checks whether the learning calculations in step S114 have been repeated a predetermined number of times or not. That is, the learning unit 151 checks whether learning of a predetermined number of pieces of training data has been completed or not. When the learning of the predetermined number of pieces of training data has not been completed, the routine returns to step S108, and the learning unit 151 repeats the series of processes. When the learning of the predetermined number of pieces of training data has been completed, the second learning step is terminated.

Figure 13:
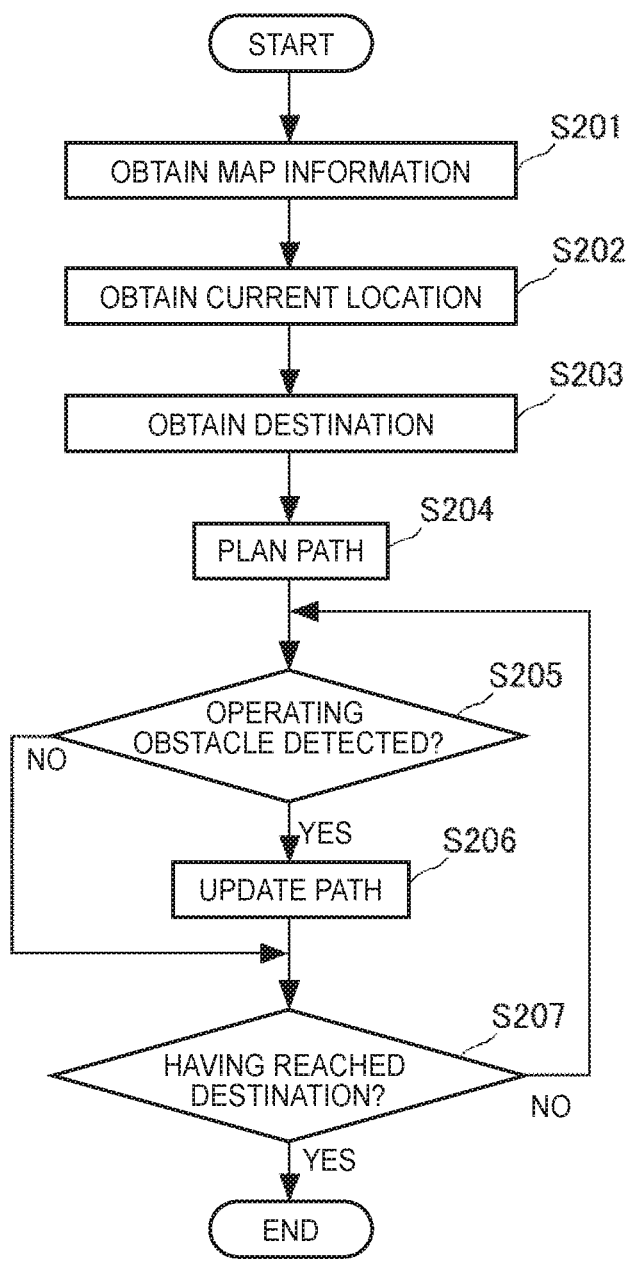
FIG. 13 is a flowchart illustrating the processing for autonomous movement of the mobile robot having a learned neural network according to the present embodiment installed therein.

Next, how the learned path planning NN 200 thus learned is used in the mobile robot 100 will be described. FIG. 13 is a flowchart illustrating the processing for autonomous movement of the mobile robot 100 having the learned path planning NN 200 installed therein.

In step S201, the control unit 150 of the mobile robot 100 obtains map information on a space where the mobile robot 100 is going to move autonomously. Like the map information obtained in step S107 of the second learning step, the obtained map information is map information describing first obstacles. In the case where the map information obtained in step S107 can be used as it is, the step S201 may be skipped. In step S202, the control unit 150 obtains the current location as in step S108 of the second learning step. In step S203, the control unit 150 obtains a destination. Specifically, the control unit 150 receives a destination input from the user, or extracts a point to which the mobile robot 100 should move to perform a given task and sets this point as a destination. The communication unit 190 that loads the map information from the system server 500 to the map DB 181 functions as an obtaining unit that cooperates with the control unit 150 to obtain the map information. The input unit that is used when the user enters a destination or a task functions as an obtaining unit that cooperates with the control unit 150 to obtain the destination.

In step S204, the control unit 150 reads the learned path planning NN 200 from the memory 180. The calculation unit 152 then plans a travel path to the destination using the read path planning NN 200. The input values to the path planning NN 200 at this point are the arrangement of the first obstacles shown in the obtained map information, the starting point (current location), and the destination, and information on second obstacles are not provided to the path planning NN 200. In the case where a second obstacle has been detected before the mobile robot 100 starts moving, the relative position of the second obstacle and the direction and speed of operation of the second obstacle may be added to the input values. After the travel path is planned, the control unit 150 sends a drive signal to the platform drive unit 145 to move the mobile robot 100 along the travel path.

The control unit 150 monitors whether any second obstacle, which is an obstacle that operates, is present around the mobile robot 100 or not while the mobile robot 100 is moving. Specifically, the control unit 150 periodically analyzes an image of the stereo camera 131 and an output signal of the laser scanner 133 to detect a second obstacle that is present around the mobile robot 100. When it is determined in step S205 that no second obstacle has been detected, the routine proceeds to step S207. When it is determined in step S205 that a second obstacle has been detected, the routine proceeds to step S206.

In step S206, the calculation unit 152 updates the travel path to the destination again using the path planning NN 200. The input values at this time are the original travel path, the relative position of the detected second obstacle, and the direction and speed of operation of the detected second obstacle. After the calculation unit 152 updates the travel path, the control unit 150 sends a drive signal to the platform drive unit 145 to move the mobile robot 100 along the updated travel path.

In step S207, the control unit 150 determines whether the mobile robot 100 has reached the destination obtained in step S203 or not. When it is determined in step S203 that the mobile robot 100 has not reached the destination, the routine returns to step S205 and the mobile robot 100 continues to move to the destination. When it is determined in step S203 that the mobile robot 100 has reached the destination, the series of processes for moving the mobile robot 100 is terminated.

In the above process flow, the path is updated in step S206 every time a second obstacle is detected in step S205. However, the path may not be updated in the case where it is determined that the detected second obstacle does not affect the movement of the mobile robot 100 along the original travel path. For example, the path is not updated in the case where the second obstacle is moving in a direction away from the travel path of the mobile robot 100.

In the above embodiment, training data for a second obstacle is generated in the second learning step by detecting an obstacle (second obstacle) that operates in a real environment. However, training data for a virtual second obstacle may be included. For example, the learning unit 151 generates virtual second obstacles, which operate at the same speed as that of the second obstacle obtained when the real second obstacle is detected, at various relative positions in various operating directions. The learning unit 151 handles such virtual second obstacles in a manner similar to that in which it handles a real second obstacle when it recognizes the real second obstacle. The learning unit 151 displays the virtual second obstacles by, e.g., computer graphics (CG) on the display panel 141. The user checks the second obstacles by the CG displayed on the display panel 141 and provides an avoidance path avoiding the second obstacles and a direction to be avoided to the mobile robot 100. In the case where the training data for the virtual second obstacles is generated, the learning effect of the path planning NN 200 is enhanced.

In the above embodiment, the user has performed learning by supervised learning by providing a correct answer travel path. However, reinforcement learning may be performed in which, e.g., a travel path of the lowest cost is found according to a predetermined evaluation criteria. With the reinforcement learning, the operation by the user can be omitted, whereby learning can be performed quickly.

What is claimed is:

1. A machine learning method for a neural network that causes a computer to function to output a path for a mobile robot to move to a destination, based on provided map information and detected moving body information, the method comprising:
    a first learning step which is performed by a computing device other than the mobile robot in a phase before the neural network is installed in the mobile robot and in which a stationary first obstacle is placed in a set space and the first obstacle is placed at different positions using simulation such that the neural network repeatedly learns a path from a starting point to the destination which avoids the first obstacle; and
    a second learning step which is performed by the mobile robot in a phase after the neural network is installed in the mobile robot and in which, when the mobile robot recognizes a second obstacle that operates around the mobile robot in a space where the mobile robot moves, the neural network repeatedly learns a path to the destination which avoids the second obstacle every time the mobile robot recognizes the second obstacle.

2. The machine leaning method according to claim 1, wherein
    in the second learning step, the neural network learns the path indicated by a user as at least a part of the path to the destination.

3. The machine learning method according to claim 2, wherein
    in the second learning step, the path indicated by the user is obtained based on a voice of the user.

4. The machine learning method according to claim 2, wherein
    in the second learning step, the path indicated by the user is obtained based on an action of the user.

5. The machine learning method according to claim 2, wherein
    in the second learning step, the path indicated by the user is obtained based on a force that is applied to the mobile robot by the user.

6. The machine learning method according to claim 1, wherein
    the second learning step includes a case where a virtual second obstacle is generated and the mobile robot is caused to recognize the virtual second obstacle.

7. The machine leaning method according to claim 1, wherein
    a moving plane on which the mobile robot moves in the set space is represented by m by n cells, n and m being a natural number of 2 or greater, and the first obstacle and the second obstacle are recognized by the mobile robot as obstacles that occupies the cells.

8. A mobile robot in which a learned neural network is installed, the learned neural network having learned by the machine learning method according to claim 1, the mobile robot comprising:
    a wireless local area network configured to obtain map information describing the first obstacle and a destination;
    a stereo camera configured to detect the second obstacle that operates around the mobile robot; and
    a central processing unit configured to:
        input the map information and the destination which are obtained by the wireless local network and detection information on the second obstacle detected by the stereo camera to the learned neural network to calculate a path to the destination; and
        control the mobile robot to move along the calculated path.

9. The mobile robot according to claim 8, wherein
    the central processing unit is configured to update the path every time the stereo camera detects the second obstacle.

* * * * *